United States Patent
Buβer et al.

(10) Patent No.: US 8,683,219 B2
(45) Date of Patent: Mar. 25, 2014

(54) METHOD AND APPARATUS FOR CHECKING THE INTEGRITY OF DATA STORED IN A PREDETERMINED MEMORY AREA OF A MEMORY

(75) Inventors: Jens-Uwe Buβer, München (DE); Steffen Fries, Baldham (DE)

(73) Assignee: Siemens Aktiengesellschaft, Munich (DE)

( * ) Notice: Subject to any disclaimer, the term of this patent is extended or adjusted under 35 U.S.C. 154(b) by 588 days.

(21) Appl. No.: 12/452,826

(22) PCT Filed: Jul. 9, 2008

(86) PCT No.: PCT/EP2008/058909
§ 371 (c)(1),
(2), (4) Date: Jan. 25, 2010

(87) PCT Pub. No.: WO2009/013132
PCT Pub. Date: Jan. 29, 2009

(65) Prior Publication Data
US 2010/0131732 A1    May 27, 2010

(30) Foreign Application Priority Data
Jul. 24, 2007  (DE) .......................... 10 2007 034 525

(51) Int. Cl.
*H04L 29/06* (2006.01)

(52) U.S. Cl.
USPC ............ 713/189; 713/187; 713/193; 380/201

(58) Field of Classification Search
USPC ................................................ 713/181, 189
See application file for complete search history.

(56) References Cited

U.S. PATENT DOCUMENTS

| | | | |
|---|---|---|---|
| 3,900,846 A * | 8/1975 | Gibbon et al. ................... 342/37 |
| 6,954,861 B2 | 10/2005 | Watkins | |
| 7,317,798 B2 * | 1/2008 | Saito ............................. 380/277 |
| 2005/0283623 A1 | 12/2005 | Colson | |
| 2006/0047884 A1 * | 3/2006 | Tran et al. ......................... 711/3 |
| 2007/0150735 A1 * | 6/2007 | Futa et al. ...................... 713/171 |
| 2008/0168564 A1 * | 7/2008 | Lerouge et al. ................. 726/26 |

FOREIGN PATENT DOCUMENTS

| | | |
|---|---|---|
| CN | 1690909 | 11/2005 |
| EP | 1030237 A1 | 8/2000 |
| EP | 1056010 A1 | 11/2000 |

OTHER PUBLICATIONS

Chinese Office Action for related Chinese Patent Application No. 200880100239.9, mailed on Jul. 13, 2011.

* cited by examiner

*Primary Examiner* — Mohammad L Rahman
(74) *Attorney, Agent, or Firm* — Staas & Halsey LLP (57) ABSTRACT

A method checks the integrity of data stored in a predetermined memory area of a memory of a first device. The first device is coupled to at least one second device by a network The method involves providing at least one parameter which is suitable for influencing a hash value of at least one predetermined hash function. At least one hash value is calculated on the basis of the data stored in the predetermined memory, the at least one predetermined hash function and the at least one parameter. The second device checks the integrity of the data stored in the predetermined memory area of the first device on the basis of the calculated hash value or values.

16 Claims, 4 Drawing Sheets

METHOD AND APPARATUS FOR CHECKING THE INTEGRITY OF DATA STORED IN A PREDETERMINED MEMORY AREA OF A MEMORY

CROSS REFERENCE TO RELATED APPLICATIONS

This application is based on and hereby claims priority to PCT Application No. PCT/EP2008/058909 filed on Jul. 9, 2008 and DE Application No. 10 2007 034 525.0 filed on Jul. 24, 2007, the contents of which are hereby incorporated by reference.

BACKGROUND OF THE INVENTION

The technical field of this document relates to checking the integrity of stored data, in particular of firmware or software. Such software or firmware is suitable for controlling field units, sensors, actuators, DVD drives, hard drives or the like. These can furthermore be suitable for communicating by a network with one another or with other units, such as servers or personal computers. If these units are physically unprotected however, then attackers have the facility to access the software or firmware in particular for the purpose of reverse engineering. There is also a danger of manipulated software or firmware being brought back onto the corresponding unit.

Security against manipulation of the software or firmware for the corresponding unit could be achieved by hardware measures, such as sealing the unit for example. No further manipulation is possible after the unit has been sealed. Any subsequent intentional and desired, legal firmware update would then however also no longer be possible.

A further protection capability can be achieved by checking the integrity and authenticity of the firmware installed during the firmware update based on digital signatures. This does however presuppose that a check can be performed during the installation procedure and the memory chip for the firmware is not simply replaced.

As a further option affording security against manipulation a method is known internally to the applicant for performing a software integrity check for a unit by calculating a checksum for the software currently present and comparing the calculated checksum with a stored checksum. In this situation, the checksum can be designed as a cryptographic checksum and the stored checksum can be stored signed. Thus, when the corresponding unit is connected by a network, other network nodes or devices can interrogate this checksum by way of the existing communication channels and compare it with the desired value. However, if the software of the corresponding unit is overwritten by a manipulated firmware update, then this checking capability is also rendered inoperative because the manipulated unit also continues to be able to respond to inquiries for its checksum with the desired value, provided the corresponding checksum remains stored in the manipulated unit. Then although the stored checksum no longer corresponds to the actual checksum of the software currently present in the corresponding unit, this is however permanently stored in the manipulated unit so as to feign the integrity of the stored software.

SUMMARY

One potential object is accordingly to monitor the integrity of stored data, in particular of firmware or software, in a first device by second device coupled to the first device.

The inventors propose a method for checking the integrity of data stored in a predetermined memory area of a memory of a first device, whereby the first device is coupled to at least one second device by a network, which method has the following steps:

a) provision of at least one parameter which is suitable for influencing a hash value of at least one predetermined hash function;

b) calculation of at least one hash value on the basis of the data stored in the predetermined memory, the at least one predetermined hash function and the at least one parameter; and c) checking of the integrity of the data stored in the predetermined memory area of the first device on the basis of the calculated hash value(s) by the second device.

In addition, a system for checking the integrity of data stored in a predetermined memory area of a first device is proposed, whereby the first device is coupled to at least one second device by a network, whereby the system has:

a unit for determining or providing at least one parameter which is suitable for influencing a hash value of at least one predetermined hash function;

the first device, which calculates at least one hash value on the basis of the data stored in the predetermined memory, the at least one predetermined hash function and the at least one parameter; and the second device, which checks the integrity of the data stored in the predetermined memory area of the first device on the basis of the calculated hash value(s).

An advantage of the proposed method relates to the fact that the checked first device can only calculate and generate the correct hash value(s) in the situation when the first device does actually have at its disposal all the data to be checked for integrity. In particular, in consequence of using the parameter influencing the respective hash value it is not sufficient to calculate once and then save the hash value(s) of the data, such that the data could be deleted or overwritten.

By preference, the memory of the first device is configured in such a manner that it has a second memory area in addition to the predetermined (first) memory area for storing the data. The first memory area is suitable for storing the data, in particular the software or firmware, of the first device. The second memory area is provided in particular for storing data content which does not need to be protected. If for example the first device is designed as a sensor, then the second memory area is intended for storing the respective measurement data and/or the identification number of the sensor.

In particular, the first memory area is configured to be larger or very much larger than the second memory area.

Examples of hash functions which can be used are MD5, SHA-1, SHA-2xx.

According to a preferred development, the step c) comprises:

c1) transfer of the at least one calculated hash value from the first device to the second device by the network;

c2) calculation of at least one comparison hash value on the basis of a copy of the data stored in the predetermined memory area, which is stored in the second device, the at least one predetermined hash function and the at least one predetermined parameter; and c3) comparison by the second device of the transferred hash value with the calculated comparison hash value in order to provide a checking result.

According to a preferred embodiment, the at least one parameter includes a plurality of memory location pointers, whereby each two memory location pointers define a memory section of the predetermined memory area and the defined memory sections cover at least the predetermined memory area, whereby in each case a hash value is calculated on the basis of the data of one of the memory sections and one of the predetermined hash functions.

According to a further preferred embodiment, the at least one parameter includes two memory location pointers, whereby a first memory location pointer and an end of the predetermined memory area define a first memory section, a second memory location pointer and a beginning of the predetermined memory area define a second memory section and the defined memory sections at least cover the predetermined memory area, whereby in each case a hash value is calculated on the basis of the data of one of the memory sections and of one of the predetermined hash functions.

According to a further preferred embodiment, the at least one parameter is designed as a single memory cell pointer which divides the predetermined memory area into two memory sections, whereby in each case a hash value is calculated on the basis of the data of one of the memory sections and of one of the predetermined hash functions.

According to a further preferred embodiment, the respective comparison hash value is calculated by the second device on the basis of a copy of the data stored in the respective memory section and the respective predetermined hash function.

According to a further preferred embodiment, the at least one parameter is designed as a random number, by which the respective hash function is initialized. The respective hash value is calculated on the basis of the data stored in the predetermined memory area and of the respective initialized hash function.

According to a further preferred embodiment, the respective comparison hash value is calculated by the second device on the basis of a copy of the data stored in the predetermined memory area and of the respective predetermined initialized hash function.

According to a further preferred embodiment, the at least one hash value is calculated on the basis of the data stored in the predetermined memory area, the at least one predetermined hash function, the at least one parameter and an identification number of the first device. The same then correspondingly also applies to the comparison hash value.

According to a further preferred development, the step a) comprises the following method substeps:

a1) provision by the second device of the at least one parameter which is suitable for influencing a hash value of at least one predetermined hash function; and a2) transfer of the provided parameter from the second device to the first device.

According to a further preferred embodiment, the first device derives the at least one parameter from the calculated hash value(s) of a preceding integrity check.

According to a further preferred embodiment, a new parameter is provided in each case with regard to each check of the data stored in the predetermined memory area.

Furthermore, a computer program product is proposed which initiates the execution of a method as described above on a program controlled device for integrity checking.

It is conceivable for example to supply the computer program product as a storage medium such as a memory card, USB stick, floppy disk, CD-ROM, DVD or also in the form of a downloadable file from a server in a network. This can take place for example in a wireless communication network through the transfer of a corresponding file containing the computer program product onto the first and/or second device.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
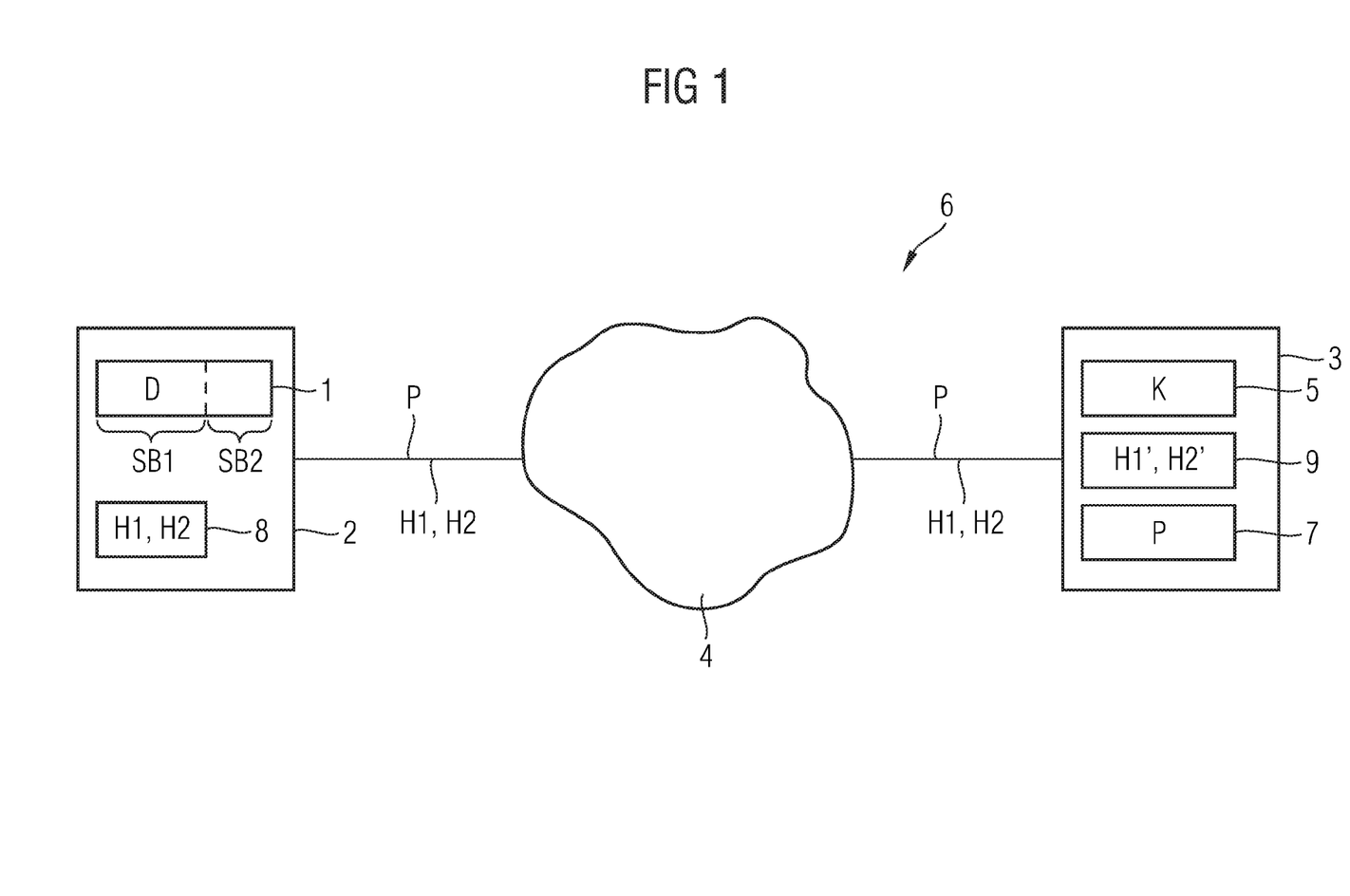
FIG. 1 shows a schematic block diagram of an exemplary embodiment of the proposed system.

FIG. 1 shows a schematic block diagram of an exemplary embodiment of the proposed system 6 for checking the integrity of data D stored in a predetermined memory area SB1 of a memory 1 of a first device 2. The first device 2 is coupled to at least one second device 3 by a network 4.

The system 6 has a first unit 7, the first device 2 and the second device 3. According to the exemplary embodiment shown in FIG. 1, the first unit 7 is arranged in the second device 3. It is however also conceivable to arrange the first unit 7 in the first device 2, whose data D is to be checked for its integrity. The first unit 7 is suitable for determining or providing at least one parameter P, which is suitable for influencing a hash value H1, H2 of at least one predetermined hash function.

The first device 2 calculates at least one hash value H1, H2 on the basis of the data D stored in the predetermined memory area SB1, the at least one predetermined hash function and the at least one parameter P.

If for example only one hash value H1 is calculated over the entire predetermined memory area SB1, then the hash value H1 is yielded by the equation (1) below:

$$H1 = f_{hash}(P, D(SB1)), \quad (1)$$

whereby P denotes the parameter, $f_{hash}$ the hash function used and D(SB1) the data which is stored in the predetermined memory area SB1.

Reference character 8 denotes a second unit which is provided in the first device 2 and performs the calculation of the hash values H1, H2.

The second device 3 is suitable for checking the integrity of the data D stored in the predetermined memory area SB1 of the first device on the basis of the calculated hash value H1 or the calculated hash values H1, H2. To this end, the second device 3 has a third unit 9 which calculates at least one comparison hash value H1', H2' on the basis of a copy K of the data D stored in the predetermined memory area SB1 which is stored in a second memory 5 of the second device 3, the at least one predetermined hash function $f_{hash}$ and the at least one predetermined parameter P.

For the example outlined above the third unit 9 calculates the single comparison hash value H1' by the following equation (2):

$$H1'=f_{hash}(P,K) \tag{2}$$

By preference, each time a new check is carried out on the data D stored in the predetermined memory area SB1 of the memory 1 of the first device 2 a new parameter P is provided by the first unit 7 in each case.

In particular, the first memory area SB1 of the memory 1 is larger or considerably larger than the second memory area SB2 of the memory 1, which does not store content items requiring integrity checking.

Figure 2:
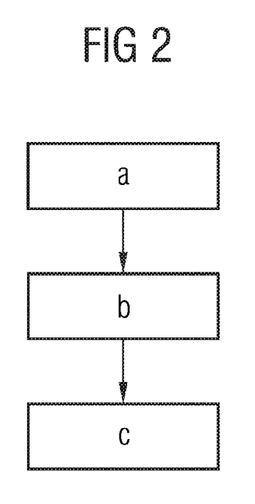
FIG. 2 shows a schematic flowchart of a first exemplary embodiment of the method.

FIG. 2 shows a first exemplary embodiment of the method for checking the integrity of data D stored in the predetermined memory area SB1 of the memory 1 first device 2. The first exemplary embodiment of the method will be described in the following on the basis of the block diagram in FIG. 2 with reference to FIG. 1. The first exemplary embodiment of the method according to FIG. 2 comprises the following steps a) to c):

Step a):
At least one parameter P is provided which is suitable for influencing a hash value H1, H2 of at least one predetermined hash function.

By preference, each time a new check is carried out on the data D stored in the predetermined memory area SB1 a new parameter P is provided in each case.

Step b):
The at least one hash value H1, H2 is calculated on the basis of the data D stored in the predetermined memory area SB1, the at least one hash function and the at least one parameter P.

Step c):
The integrity of the data D stored in the predetermined memory area SB1 of the first device 2 is checked by the second device 3 on the basis of the calculated hash value H1 or the calculated hash values H1, H2.

In particular, in the case of regularly occurring checks on the integrity, the parameter P or the parameters P can be derived from the hash value H1 or the hash values H1, H2 of the previous check. For example, P could be derived as the 32 least significant bits of the hash value H1 of the preceding check.

The first device 2 to be checked can thus give proof of the integrity of its data D, or software or firmware, without the need to have to obtain the corresponding parameter P or the corresponding parameters P from the second device 3 every time before the check is performed. Consequently, a request message from the second device 3 performing the checking to the first device 2 to be checked can be dispensed with. This is in particular of great advantage in the situation when the second device 3 is designed as a checking server which has a multiplicity of first devices 2 or network nodes to check.

This variant is advantageous in particular in the situation when it ensures that no messages are lost between the first device 2 and the second device 3. If this cannot be ensured, however, then it is additionally necessary to implement a synchronization mechanism for the checking.

Figure 3:
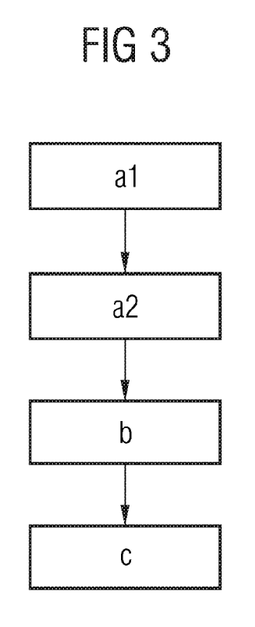
FIG. 3 shows a schematic flowchart of a second exemplary embodiment of the method.

FIG. 3 shows a second exemplary embodiment of the proposed method. The second exemplary embodiment in accordance with FIG. 3 differs from the first exemplary embodiment in accordance with FIG. 2 in that the steps a1) and a2) in accordance with FIG. 3 replace the step a) in accordance with FIG. 2. In contrast, the steps b) and c) correspond to each other and are not described for this reason. The second exemplary embodiment of the system in accordance with FIG. 3 accordingly comprises the steps a1) and a2) described below and the steps b) and c) described with reference to FIG. 2:

Step a1):
The at least one parameter P, which is suitable for influencing a hash value H1, H2 of at least one predetermined hash function, is provided by the second device 3.

Step a2):
The provided parameter P is transferred from the second device 3 to the first device 2 by the network 4.

Figure 4:
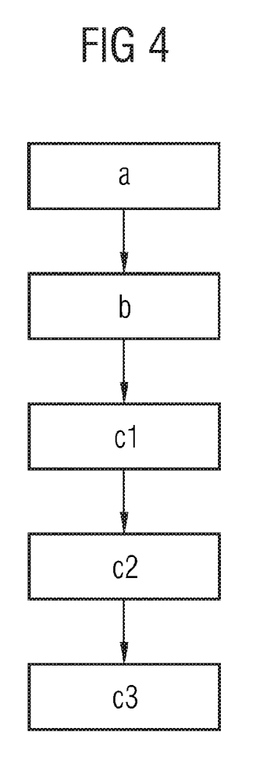
FIG. 4 shows a schematic flowchart of a third exemplary embodiment of the method.

FIG. 4 shows a third exemplary embodiment of the proposed method. The third exemplary embodiment of the method in accordance with FIG. 4 differs from the first exemplary embodiment of the system in accordance with FIG. 2 in that the steps c1) to c3) in accordance with FIG. 4 replace the step c) in accordance with FIG. 2. The steps a) and b) in accordance with FIG. 4 correspond to the steps a) and b) in accordance with FIG. 2. Accordingly, the third exemplary embodiment of the method in accordance with FIG. 4 comprises the steps a) and b) described for FIG. 2 and also the steps c1) to c3) described in the following:

Step c1):
The at least one calculated hash value H1, H2 is transferred from the first device 2 to the second device 3 by the network 4.

Step c2):
At least one comparison hash value H1', H2' is calculated on the basis of a copy K of the data D stored in the predetermined memory area SB1 which is stored in the second device 3, the at least one predetermined hash function and the at least one predetermined parameter P. If for example the first device 2 calculates two hash values H1 and H2 in accordance with equations (3) and (4) below, then the second device 3 calculates the respective comparison hash values H1' and H2' by equations (5) and (6) below:

$$H1=f\text{hash}(P,D(SB1)) \tag{3}$$

$$H2=f\text{hash}(P,D(SB1)) \tag{4}$$

$$H1'=f\text{hash}(P,K) \tag{5}$$

$$H2'=f\text{hash}(P,K) \tag{6}$$

In particular, the two hash functions $f_{hash}$ and $f'_{hash}$ are designed differently. They may however also be identical.

FIGS. 5 to 9 show embodiments of the three exemplary embodiments of the method in accordance with FIGS. 2 to 4, in particular the method in accordance with FIG. 2.

Figure 5:
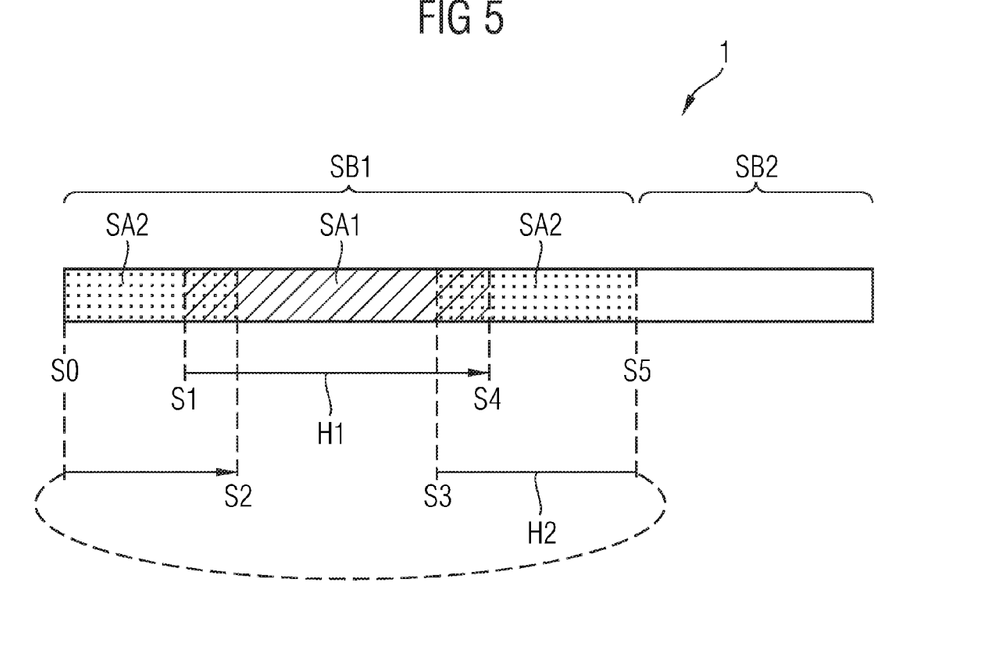
FIG. 5 shows a schematic block diagram of the memory of the first device, on which a first embodiment of the method according to FIG. 2 is applied.

In accordance with FIG. 5, the at least one parameter P includes four memory location pointers S1-S4.

The memory location pointers S1 and S4 define a first memory section SA1 of the predetermined memory area SB1. In addition, the memory location pointers S2 and S3 define a second memory section SA2 of the predetermined memory area SB1. The two memory sections SA1 and SA2 at least cover the predetermined memory area SB1. In accordance with the exemplary embodiment according to FIG. 5, an overlap is also formed between the memory location pointers S1 and S2 as well as between S3 and S4.

The first hash value H1 is calculated on the basis of the data D(SA1) of the first memory section SA1 and one of the predetermined hash functions $f_{hash}$ (see equation 7):

$$H1 = f_{hash}(D(SA1)) \quad (7)$$

The second hash value H2 is calculated on the basis of the data D(SA2) of the second memory section SA2 and one of the predetermined hash functions $f'_{hash}$ (see equation 8):

$$H2 = f'_{hash}(D(SA2)) \quad (8)$$

The hash functions $f_{hash}$ and $f'_{hash}$ can be designed differently, but they may also be identical.

In particular, the memory location pointers S1 to S4 are provided to the first device 2 by the second device 3 undergoing checking, with the result that the checked device 2 has no facility to precalculate the hash values H1 and H2 of the hash functions $f_{hash}$, $f'_{hash}$ partially or in their entirety and thus to exclude parts of the data D, or the software, from the check.

Figure 6:
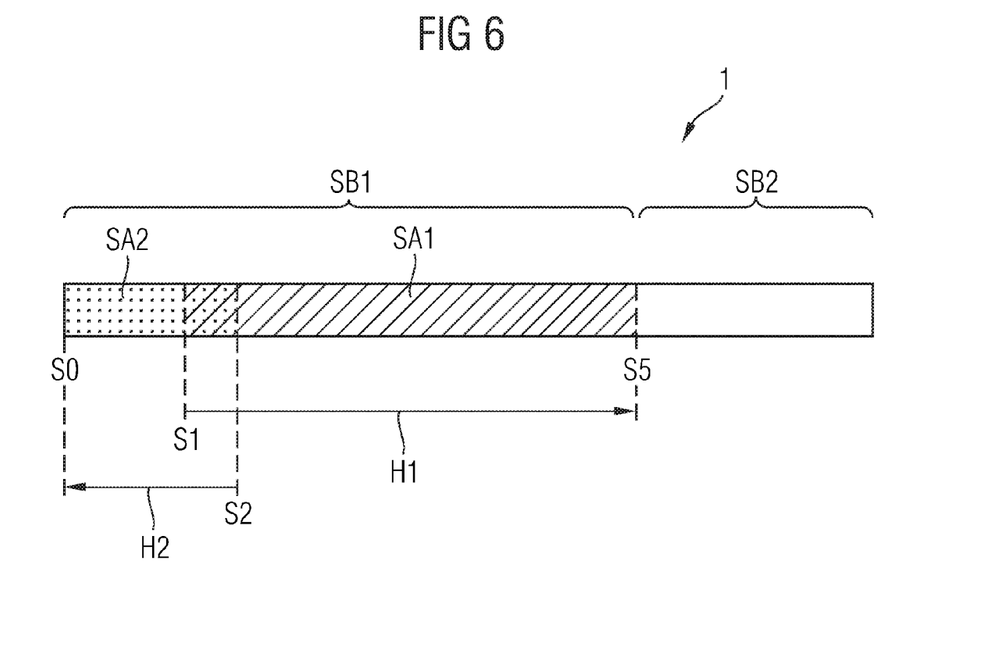
FIG. 6 shows a schematic block diagram of the memory of the first device, on which a second embodiment of the method according to FIG. 2 is applied.

In accordance with FIG. 6, the at least one parameter P includes two memory location pointers S1, S2. The first memory location pointer S1 and an end S5 of the predetermined memory area SB1 define the first memory section SA1. The second memory location pointer S2 and the beginning S0 of the predetermined memory area SB1 define the second memory section SA2. The two memory sections SA1 and SA2 in accordance with FIG. 6 not only cover the predetermined memory area SB1—as in accordance with FIG. 5—completely but also form an overlap, in accordance with FIG. 6, between S1 and S2. The calculation of the hash values H1, H2 ensues analogously from the above equations (7) and (8).

Figure 7:
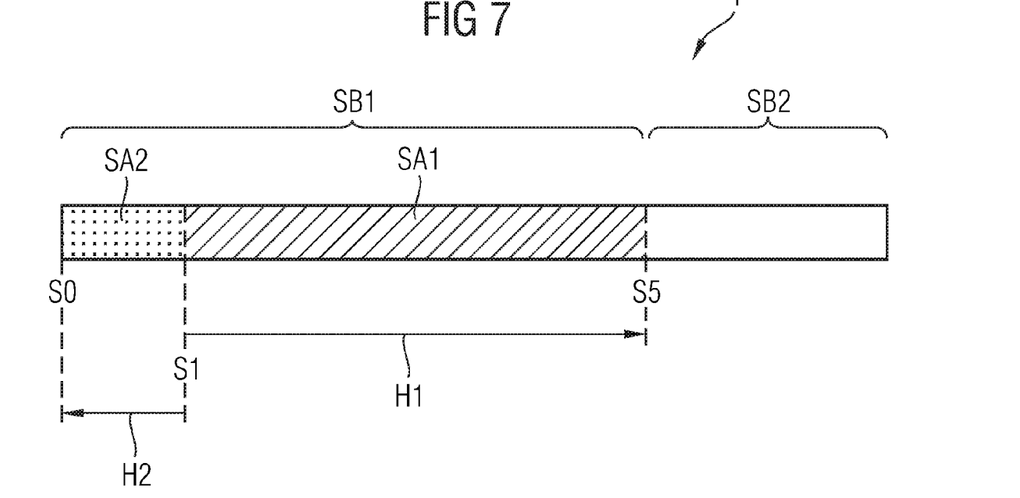
FIG. 7 shows a schematic block diagram of the memory of the first device, on which a third embodiment of the method according to FIG. 2 is applied.

In accordance with FIG. 7, the at least one parameter P is designed as a single memory location pointer S1 which divides the predetermined memory area SB1 into the two memory sections SA1, SA2. The calculation of the hash values H1, H2 ensues analogously from the above equations (7) and (8).

Naturally, the predetermined memory area SB1 in accordance with FIGS. 5 to 7 can be subdivided not only into two memory sections SA1, SA2 but into any desired number of memory sections, whereby then either a separate hash value is calculated for each memory section or a common hash value is calculated for a plurality of memory sections which are combined in any desired, but a permanently defined, sequence.

Figure 8:
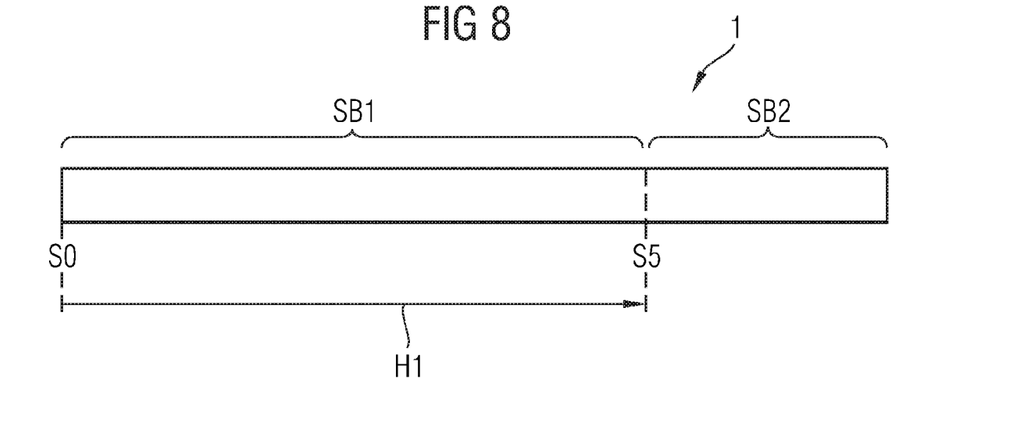
FIG. 8 shows a schematic block diagram of the memory of the first device, on which a fourth embodiment of the method according to FIG. 2 is applied.
Figure 9:
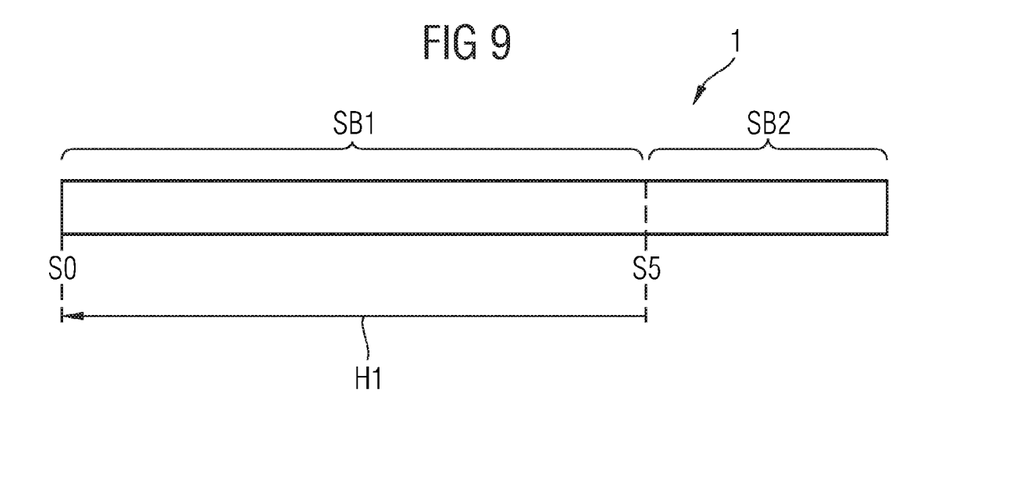
FIG. 9 shows a schematic block diagram of the memory of the first device, on which a fifth embodiment of the method according to FIG. 2 is applied.

In accordance with FIGS. 8 and 9, the at least one parameter P is designed as at least one random number R, by which the respective hash function is initialized. The respective hash value H1 is then calculated on the basis of the data D(SB1) stored in the predetermined memory area SB1 and the respective initialized hash function $f_{hash}$. The hash value H1 is then calculated for example from the equation (9) below:

$$H1 = f_{hash}(R, D) \quad (9)$$

$$H1' = f_{hash}(R, K) \quad (10)$$

Consequently, the respective comparison hash value H1' is calculated on the basis of a copy K of the data D stored in the predetermined memory area SB1 and of the respective predetermined initialized hash function by the second device 3 (see equation (10)). The two embodiments in accordance with FIGS. 8 and 9 differ in that the calculation of the hash value H1 takes place once from the beginning S0 of the predetermined memory area SB1 to its end S5 (cf. FIG. 8) and once in the reverse direction from S5 to S0 (cf. FIG. 9).

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004). It is for example conceivable to configure the at least one parameter P in such a manner that it contains both memory location pointers and also at least one random number.

The invention claimed is:

1. A method for checking the integrity of data stored in a predetermined memory area of a first device by a second device, whereby the first device is coupled to the second device by a network, the method comprising:
   providing a parameter for influencing a hash value calculated using a predetermined hash function;
   calculating the hash value on the basis of the data stored in the predetermined memory area, the predetermined hash function and the parameter, the hash value being calculated to produce a calculated hash value; and
   checking of the integrity of the data stored in the predetermined memory area of the first device, the integrity of the data being checked by the second device on the basis of the calculated hash value, wherein the checking includes:
   transferring the calculated hash value from the first device to the second device using the network;
   calculating at least one comparison hash value based on a copy of the data stored in the predetermined memory area, the copy being stored in the second device, the predetermined hash function, and the parameter; and
   comparing the transferred calculated hash value with the calculated comparison hash value at the second device and providing a review result,
   wherein the parameter includes a plurality of memory location pointers that define at least two memory sections of the predetermined memory area and the at least two defined memory sections cover the predetermined memory area,
   wherein a hash value is separately calculated for each of the at least two memory sections based on data stored in the respective memory section and the predetermined hash function,
   wherein the method is repeated to perform a plurality of checks of the data stored in the predetermined memory area, and
   a previously presented parameter is provided for each check of the data stored in the predetermined memory area.

2. The method as claimed in claim 1, wherein a plurality of parameters and a plurality of hash functions are used to calculate a respective plurality of hash values.

3. The method as claimed in claim 1, wherein
   the method uses a plurality of predetermined hash functions, and
   a hash value is separately calculated for each memory section, on the basis of data stored in the respective memory section and a respective one of the plurality of predetermined hash functions.

4. The method as claimed in claim 3, wherein
   the second device has memory sections corresponding to the memory sections of the first device,
   a copy of the data is stored in the memory sections of the second device, and the comparison hash value is separately calculated by the second device for each memory section of the second device, on the basis of the copy of the data stored in the respective memory section and the respective one of the predetermined hash functions.

5. The method as claimed in claim 1, wherein
the parameter includes first and second memory location pointers,
the first memory location pointer and an end of the predetermined memory area define a first defined memory section,
the second memory location pointer and a beginning of the predetermined memory area define a second defined memory section,
the first and second defined memory sections cover at least the predetermined memory area,
the method uses a plurality of predetermined hash functions, and
a hash value is separately calculated for each memory section, on the basis of data stored in the memory section and a respective one of the plurality of predetermined hash functions.

6. The method as claimed in claim 5, wherein
the second device has memory sections corresponding to the memory sections of the first device,
a copy of the data is stored in the memory sections of the second device, and
the comparison hash value is separately calculated by the second device for each memory section of the second device, on the basis of the copy of the data stored in the respective memory section and the respective one of the predetermined hash functions.

7. The method as claimed in claim 1, wherein
the parameter is at least one random number,
each random number is used to initialize a respective hash function, and
the hash value is separately calculated for each hash function, on the basis of the data stored in the predetermined memory area.

8. The method as claimed in claim 7, wherein
the comparison hash value is separately calculated by the second device for each hash function, on the basis of a copy of the data stored in second device.

9. The method as claimed in claim 1, wherein
the first device has an identification number, and
the hash value is calculated on the basis of the data stored in the predetermined memory area, the predetermined hash function, the parameter and the identification number of the first device.

10. The method as claimed in claim 1, wherein providing the parameter comprises:
providing the parameter from the second device; and
transferring the parameter from the second device to the first device.

11. The method as claimed in claim 1, wherein
the first device derives the parameter from the calculated hash value of a preceding integrity check.

12. A non-transitory computer readable storage medium storing a program for controlling a computer to perform a method for checking the integrity of data stored in a predetermined memory area of a first device by a second device, whereby the first device is coupled to the second device by a network, the method comprising:
providing a parameter for influencing a hash value calculated using a predetermined hash function;
calculating the hash value on the basis of the data stored in the predetermined memory area, the predetermined hash function and the parameter, the hash value being calculated to produce a calculated hash value; and
checking of the integrity of the data stored in the predetermined memory area of the first device, the integrity of the data being checked by the second device on the basis of the calculated hash value, wherein the checking includes:
transferring the calculated hash value from the first device to the second device using the network;
calculating at least one comparison hash value based on a copy of the data stored in the predetermined memory area, the copy being stored in the second device, the predetermined hash function, and the parameter; and
comparing the transferred calculated hash value with the calculated comparison hash value at the second device and providing a review result,
wherein the parameter includes a plurality of memory location pointers that define at least two memory sections of the predetermined memory area and the at least two defined memory sections cover the predetermined memory area,
wherein a hash value is separately calculated for each of the at least two memory sections based on data stored in the respective memory section and the predetermined hash function,
wherein the method is repeated to perform a plurality of checks of the data stored in the predetermined memory area, and
a previously presented parameter is provided for each check of the data stored in the predetermined memory area.

13. A system for checking the integrity of data, comprising:
a parameter unit to provide a parameter for influencing a hash value calculated using a predetermined hash function;
a first device having a predetermined memory area with the data stored in the predetermined memory area, the first device calculating the hash value on the basis of the data stored in the predetermined memory area, the predetermined hash function and the parameter, the hash value being calculated to produce a calculated hash value; and
a second device coupled to the first device via a network, to check the integrity of the data stored in the predetermined memory area of the first device on the basis of the calculated hash value, wherein the check includes:
transferring the calculated hash value from the first device to the second device using a network that connects the first device and the second device;
calculating at least one comparison hash value based on a copy of the data stored in the predetermined memory area, the copy being stored in the second device, the predetermined hash function, and the parameter; and
comparing the transferred calculated hash value with the calculated comparison hash value at the second device and providing a review result,
wherein the parameter includes a plurality of memory location pointers that define at least two memory sections of the predetermined memory area and the at least two defined memory sections cover the predetermined memory area,
wherein a hash value is separately calculated for each of the at least two memory sections based on data stored in the respective memory section and the predetermined hash function,
wherein the check is repeated to perform a plurality of checks of the data stored in the predetermined memory area, and a previously presented parameter is provided for each check of the data stored in the predetermined memory area.

14. The method as claimed in claim 1, wherein the first device is a separate entity from the second device.

15. The non-transitory computer readable storage medium as claimed in claim 12, wherein the first device is a separate entity from the second device.

16. The system as claimed in claim 13, wherein the first device is a separate entity from the second device.

* * * * *